United States Patent [19]

Ickes et al.

[11] Patent Number: 5,724,735
[45] Date of Patent: Mar. 10, 1998

[54] METHOD FOR CONSTRUCTING A CATALYTIC EXHAUST TREATMENT DEVICE FOR AUTOMOTIVE VEHICLE

[75] Inventors: Walter D. Ickes, Plymouth; Andrew J. Montalbano, Taylor, both of Mich.

[73] Assignee: Ford Global Technologies, Inc., Dearborn, Mich.

[21] Appl. No.: 769,291

[22] Filed: Dec. 18, 1996

Related U.S. Application Data

[60] Continuation of Ser. No. 336,714, Nov. 9, 1994, abandoned, which is a division of Ser. No. 254,627, Jun. 6, 1994, abandoned.

[51] Int. Cl.[6] .................................. F01N 3/28; B23P 15/00
[52] U.S. Cl. .................................. 29/890; 422/171; 29/515; 29/516
[58] Field of Search ........................... 29/890, 515, 516, 29/517; 422/171, 177, 179, 180, 211, 218, 221

[56] References Cited

U.S. PATENT DOCUMENTS

| | | |
|---|---|---|
| 3,159,239 | 5/1962 | Andrews . |
| 3,523,590 | 12/1962 | Straw . |
| 3,841,435 | 10/1974 | Hetherington . |
| 4,207,661 | 6/1980 | Mase et al. . |
| 4,265,953 | 5/1981 | Close ........................... 428/78 |
| 4,413,392 | 11/1983 | Otani et al. . |
| 4,470,188 | 9/1984 | Holbrook et al. ............ 29/520 |
| 4,782,661 | 11/1988 | Motley et al. ................ 60/299 |
| 4,865,818 | 9/1989 | Merry et al. ................. 29/890 |
| 4,969,264 | 11/1990 | Dryer et al. .................. 29/890 |
| 5,055,274 | 10/1991 | Abbott ......................... 29/890 |
| 5,080,406 | 1/1992 | Hyatt et al. .................. 29/520 |
| 5,096,111 | 3/1992 | Ishikawa et al. ............. 29/890 |
| 5,118,476 | 6/1992 | Dryer et al. . |
| 5,119,551 | 6/1992 | Abbott . |
| 5,329,698 | 7/1994 | Abbott ......................... 29/890 |
| 5,347,701 | 9/1994 | Hosseinian et al. ......... 29/520 |

FOREIGN PATENT DOCUMENTS

| | | |
|---|---|---|
| 2 261 553 | 6/1974 | Germany . |
| 58-35218 | 8/1981 | Japan . |
| 58-35219 | 8/1981 | Japan . |

Primary Examiner—Larry I. Schwartz
Assistant Examiner—Marc W. Butler
Attorney, Agent, or Firm—Jerome R. Drouillard

[57] ABSTRACT

A catalytic exhaust treatment device for an automotive vehicle includes a generally cylindrical substrate having a support seal at either end and with each of the support seals encircling an end of the substrate, and an intumescent mat applied to the cylindrical surface of the substrate, with the mat extending between the support seals. The catalyst further includes a cylindrical container having an inside diameter sized so as to compress the support seals and the mat such that the seals and mat are maintained in contact with the substrate and the container.

7 Claims, 2 Drawing Sheets

METHOD FOR CONSTRUCTING A CATALYTIC EXHAUST TREATMENT DEVICE FOR AUTOMOTIVE VEHICLE

This is a continuation of application Ser. No. 08/336,714 filed Nov. 9, 1994, abandoned which is a divisional of application Ser. No. 08/254,627 filed Jun. 6, 1994, abandoned.

BACKGROUND OF THE INVENTION

The present invention relates to a catalytic exhaust treatment device for an automotive vehicle.

DISCLOSURE INFORMATION

Although catalytic exhaust gas treatment devices have been used for many years in motor vehicles, the need for such devices is growing more urgent. With the advent of increasingly stringent exhaust emission control requirements, automotive manufacturers are finding it necessary to mount catalytic control devices ever closer to the engine. Closeness to the engine promotes prompt light-off of the catalyst, which is essential to the control of unburned hydrocarbons. Mounting a catalyst very close to the engine allows the exhaust gases to cool very little before entering the flow channels in the catalyst substrate and, as a result, the catalyst lights off more quickly so as to begin the conversion process in a shorter period of time.

Although mounting catalysts close to the engine allows shorter light-off times, some problems can occur. First, packaging space is quite limited in the engine compartments of modern vehicles, particularly those equipped with front wheel drive. Second, although light-off catalysts located very close to the engine generally achieve a high conversion rate quite rapidly upon cold starting of the engine, the very same engine heat which promotes light-off also tends to thermally and chemically stress the catalyst's support system. An example of a catalyst having a support system which is not serviceable for use as a close coupled light-off catalyst is shown in U.S. Pat. No. 5,118,476 to Dryer et al. The catalytic device illustrated in the '476 patent contains a support mat 13 which is not shielded from the impingement of exhaust gases at either end. Accordingly, the mat will tend to be eroded by the exhaust gases and, as a result, the catalyst will fail when the substrate becomes loose in the container and either breaks or allows large quantities of gas to bypass the substrate. Another problem associated with prior art catalysts is exterior leakage of gases from the container of the catalyst itself. So-called "clamshell" converters suffer from leaks caused by seam welding. Although the catalytic device shown in the '476 patent has a cylindrical container and may solve the problem with respect to leaking seams, the support system illustrated in the patent is inadequate.

It is an advantage of the present invention that a compact cylindrical catalyst having a leak-proof housing includes a supporting seal system which not only gives structural integrity to the finished unit so as to protect the catalyst against vibration damage, but which also protects the mat interposed between the catalyst substrate in the container from erosion due to the impingement of exhaust gases upon the mat.

It is a further advantage of a catalyst according to the present invention that the exterior volume of the catalyst housing is minimized for a given volume of the catalyst substrate, which allows the catalyst to be mounted close to the engine, even with front wheel drive automobiles having an East-West engine mounting configuration.

SUMMARY OF THE INVENTION

According to the present invention, a catalytic exhaust treatment device for an automotive vehicle includes a catalyst substrate having a generally cylindrical shape with a cylindrical surface and two ends, and a plurality of support seals with at least one seal encircling each cylindrical end of the substrate. An intumescent mat is applied to the cylindrical surface of the substrate such that the mat extends between the support seals. A cylindrical container for housing the substrate, the support seals, and the mat has an inside diameter which is sized so as to compress the support seals and the mat such that the seals and mat are maintained in contact with the substrate and the container. Each of the support seals preferably comprises a ring extending axially along the cylindrical surface of the substrate-from approximately one end of the substrate to a position not greater than one-half of the length between the end of the substrate which adjoins the seal and the center of the adjacent cylindrical surface of the substrate. The cylindrical container has a uniform inside diameter which is produced by swaging the container over that portion of its length which is occupied by the substrate and seal and mat system so that the diameter of the container is reduced to an extent that the inside diametral surface of the container compresses the seals and the mat. The mat is compressed to a final predetermined mounting density which approximates 1 g/cm$^3$ with commonly used vermiculite mats.

The present catalytic device has a leak-proof container which preferably comprises a seamless tube having a connecting structure formed initially on one end thereof. After the container is swaged to its final diameter, the device may be completed by the addition of an exit cone or other type of end structure for conducting exhaust gases away from the substrate and the catalyst.

DETAILED DESCRIPTION OF THE PREFERRED EMBODIMENT

Figure 1:
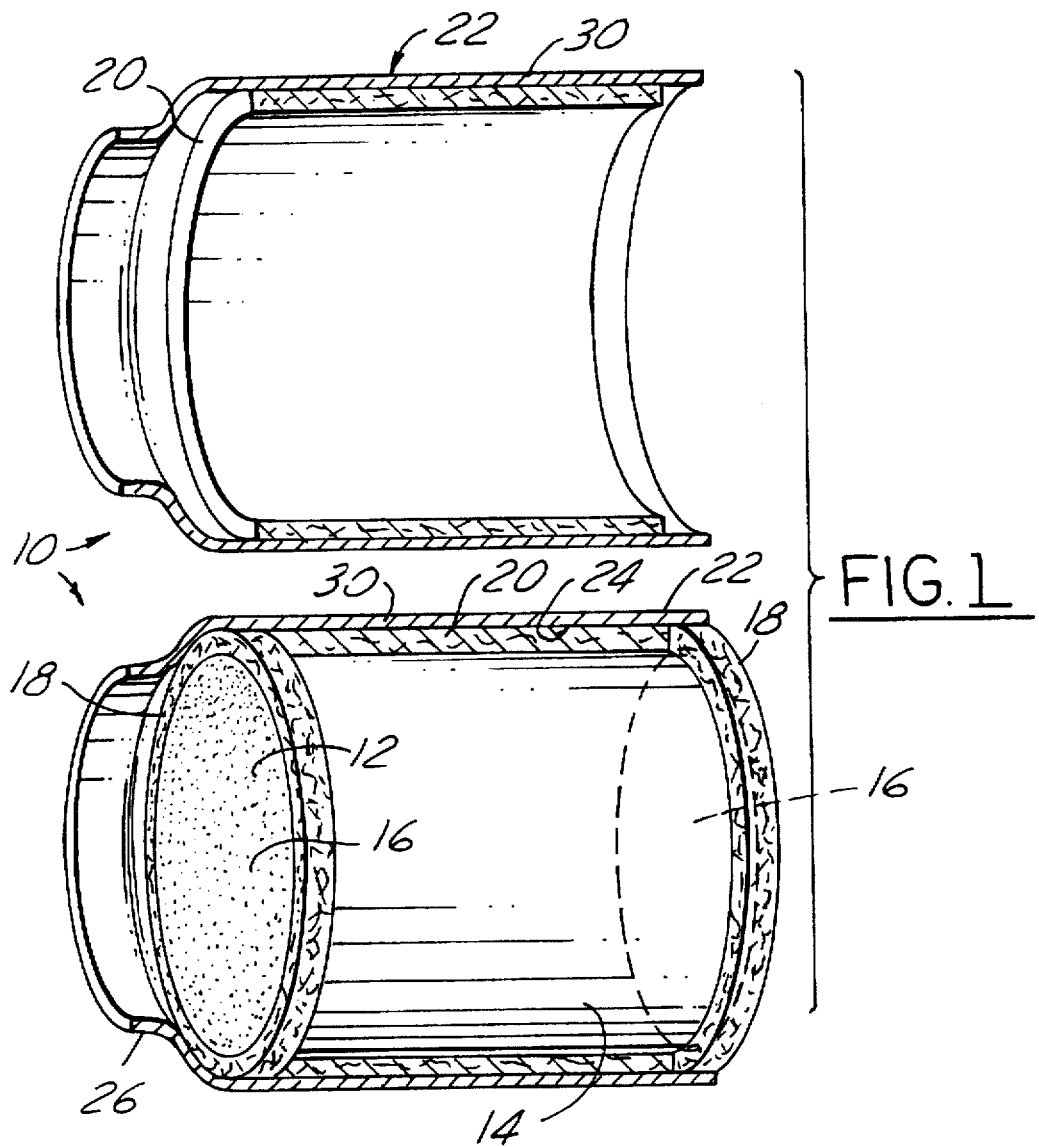
FIG. 1 is a perspective view of a catalytic exhaust treatment device according to the present invention.

As shown in FIG. 1, a catalytic converter device 10, includes container 22, which houses generally cylindrical substrate 12. Substrate 12, has a cylindrical surface 14, and two circular ends 16. Prior to being placed into container 22 during "canning", substrate 12 is equipped with intumescent mat 20, which may comprise vermiculite or other compositions known to those skilled in the art and suggested by this disclosure.

Figure 2:
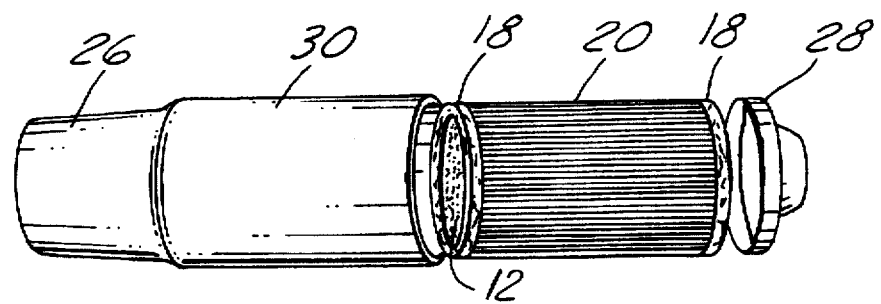
FIG. 2 is a exploded perspective of a catalytic exhaust treatment device according to the present invention.
Figure 3:
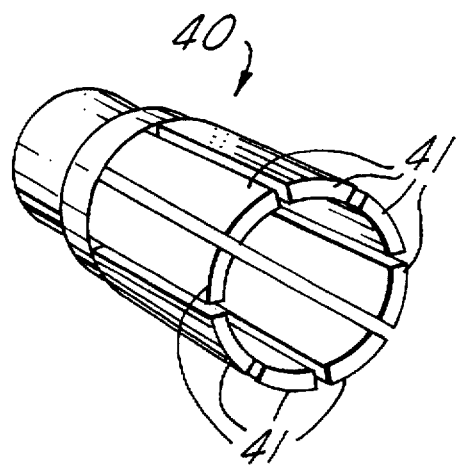
FIG. 3 is a perspective view of a swaging die useful for producing the present catalytic control device.

As shown in FIGS. 1 and 2, intumescent mat 20 occupies the center portion of cylindrical surface 14. Prior to insertion of substrate 12 into container 22, substrate 12 is overlaid with not only intumescent mat 20 but also with a plurality of support seals 18 which are shown in FIGS. 1, 2 and 3. Each support seal 18 comprises a ring which extends axially along cylindrical surface 14 from one end of the cylindrical surface toward the median or middle of cylindrical surface 14. Each support seal 18 extends for not more than one-half of the length between that end 16 of substrate 12 which it adjoins and the center of the substrate cylindrical surface 14. Preferably, each seal should not extend for more than 15% of the length of substrate 12. Said another way, mat 20 preferably occupies approximately 70% of cylindrical surface 14. Those skilled in the art will appreciate, however, in view of this disclosure that other types of support seals and mat arrangements could be utilized according to the present invention. For example, with certain applications, it may not be required to place support seals 18 adjacent substrate ends 16.

Each of support seals 18 preferably comprises a ring of woven wire mesh, which due to the high temperatures encountered by catalysts, is preferably of a material such as stainless steel, or other metallic or nonmetallic materials with resistance to corrosion at higher temperatures. Although ;other types of catalytic exhaust treatment devices, such as those housed in stamped clamshell housings have used open wire mesh, and such meshes are therefore familiar to those skilled in the art, the present system provides a superior sealing system for the outside surface—in this case, cylindrical surface 14 —so as to protect mat 20 from spallation and consequent breakdown. This superior protection arises from the fact that the inside diametral surface 24 of cylindrical wall 30, prior to being swaged toits final diameter, has a dimension which is approximately 110% of the outside diameter of the prepared substrate including substrate 12, a set of support seals 18, and mat 20. Because the initial inside diameter of diameter 24 of container 22 is 110% of the outside diameter of the substrate, including seals 18 and mat 20, the prepared substrate may be easily inserted into the container without dislodging either support seals 18 or mat 20. This is advantageous because the support seals and mat must be positioned with accuracy to avoid gas leaks around the periphery of substrate 12, which would cause impairment of the function of the catalytic device, as well as exposing mat 20 to the deleterious effects produced by exhaust gases.

According to yet another aspect of the present invention, a method for constructing a catalytic exhaust treatment device includes the steps of forming generally cylindrical container 22, preparing substrate 12 as previously described by adding seals 18 and mat 20 to substrate 12, inserting the prepared substrate into container 22, and swaging cylindrical wall 30 of container 22 over substantially the entire portion of its length which is occupied by the prepared substrate such that the circular size of container 22 is reduced to an extent that the inside diametral surface 24 of container 22 compresses seals 18 and mat 20 between cylindrical surface 14 of substrate 12 and inner diametral surface 24 of cylindrical wall 30. Mat 20 is compressed to a predetermined mounting density, which may, for example approximate 1 g/cm$^3$ for commonly employed vermiculite matting known to those skilled in the art of catalyst structure design.

Figure 4:
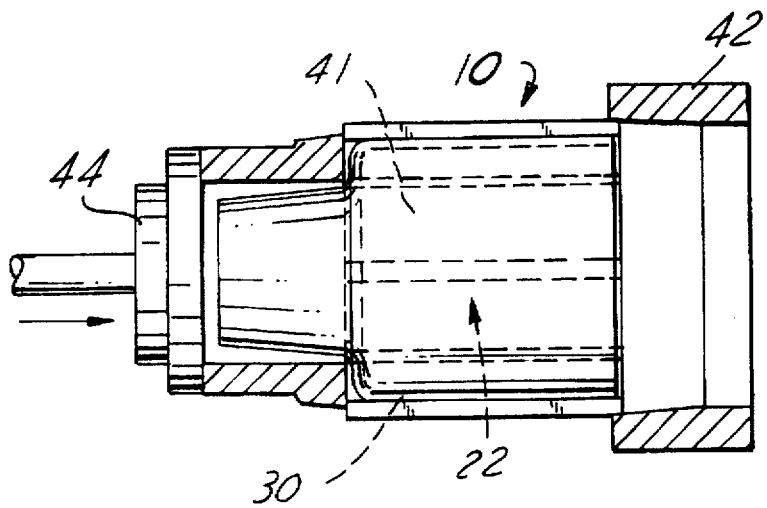
FIG. 4 shows the beginning of a swaging process according to the present invention.
Figure 5:
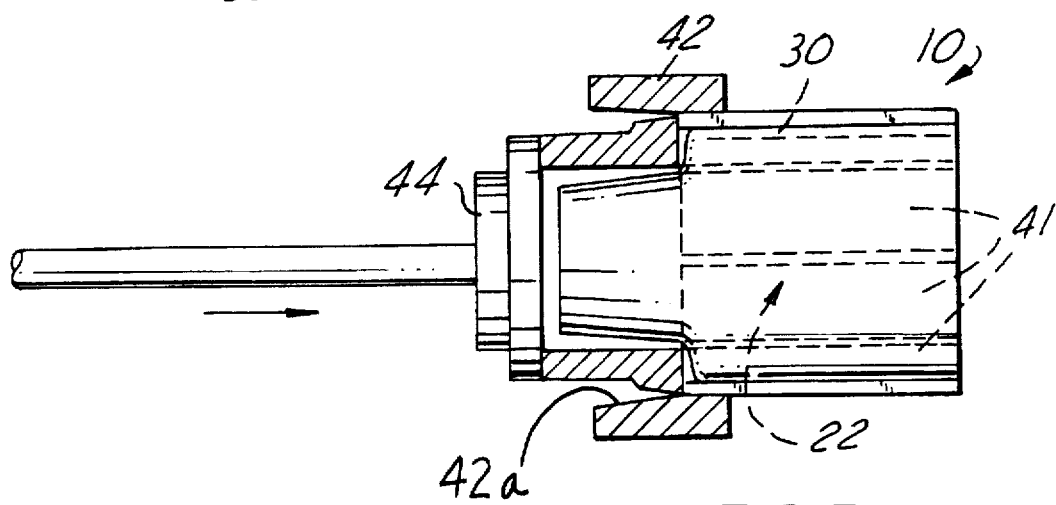
FIG. 5 shows the ending of the swaging process illustrated in FIG. 4.

A system for plastically deforming cylindrical wall 30 of container 22 is illustrated in FIGS. 3–5. FIG. 3 shows swaging die 40 having a plurality of fingers 41 which house container 22 and the prepared substrate during the swaging process. As shown in FIGS. 4 and 5, container 22 is inserted into swaging die 40, and the die is pressed into contact with swaging collar 42 by means of a hydraulic or other type of ram 44. Collar 42 has a tapered inner wall, 42a, which causes fingers 41 of swaging die 40 to move radially inward, and the axially extending fingers 41, which cover substantially the entirety of cylindrical surface 30, serve to plastically deform cylindrical wall 30 radially inwardly into contact with substantially the entire outer surfaces of seals 18 and mat 20. As a result, a leak-free, durable catalyst unit is formed. Once the catalyst has been swaged, an end structure comprising entrance cone 28 (FIG. 2) may be applied to container 22.

While the invention has been shown and described in its preferred embodiments, it will be clear to those skilled in the arts to which it pertains that many changes and modifications may be made thereto without departing from the scope of the invention.

We claim:

1. A method for constructing a catalytic exhaust treatment device for an automotive vehicle, comprising the steps of:

forming a generally cylindrical container having an inside diameter surface defining an inside diameter;

preparing a generally cylindrical catalytic ceramic substrate having a cylindrical surface for insertion into said container by applying an intumescent mat to the central portion of the cylindrical surface of the substrate, and by applying a support seal to each end of the substrate, such that each seal extends between an end of the mat and an end of the substrate;

inserting the prepared substrate into the container; and swaging the container over substantially its entire portion of its length which is occupied by the prepared substrate such that the diameter of the container is reduced to an extent that the inside diametral surface of the container compresses the seals and the mat.

2. A method according to claim 1, further comprising the step of attaching at least one end structure to said container after the container has been swaged.

3. A method according to claim 1, wherein said generally cylindrical container comprises a seamless tube.

4. A method according to claim 1, wherein said generally cylindrical container comprises a seamless tube having a connecting structure formed on one end thereof.

5. A method according to claim 1, wherein said container is swaged by placing the container in a swaging die having a plurality of fingers extending axially along substantially the cylindrical surface of the container and by thereafter displacing the fingers radially inwardly.

6. A method according to claim 1, wherein the inside diameter of the container prior to said swaging is approximately 110% of the outside diameter of the prepared substrate.

7. A method according to claim 1, wherein the the intumescent mat and each of the support seals have thicknesses which are approximately the same prior to insertion of the prepared substrate into the container.

\* \* \* \* \*